July 6, 1937.  F. W. SEECK  2,085,770
GEARLESS VARIABLE SPEED TRANSMISSION
Filed Jan. 21, 1936   7 Sheets-Sheet 1
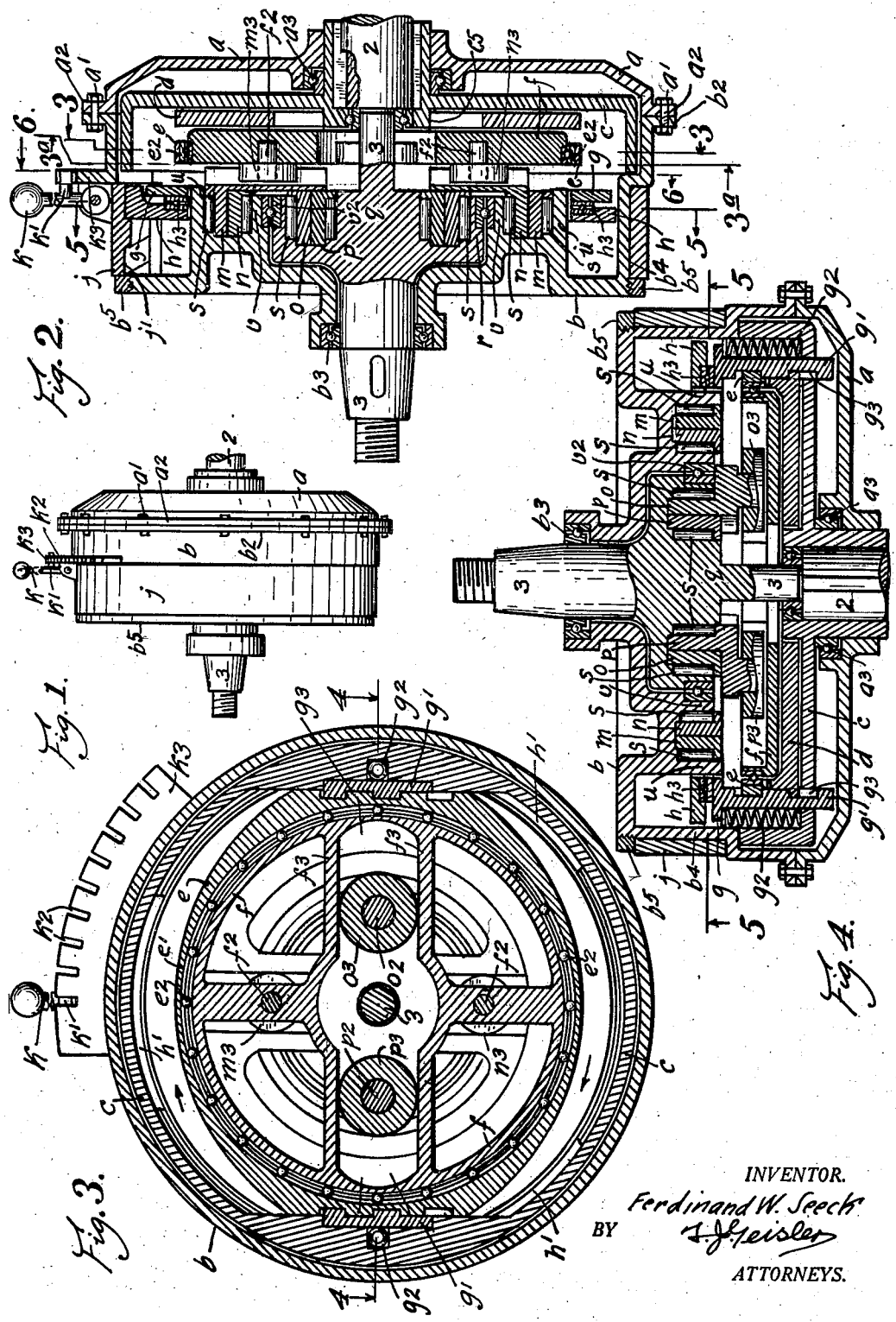
INVENTOR.
Ferdinand W. Seeck
BY
ATTORNEYS.

July 6, 1937.  F. W. SEECK  2,085,770
GEARLESS VARIABLE SPEED TRANSMISSION
Filed Jan. 21, 1936  7 Sheets-Sheet 2
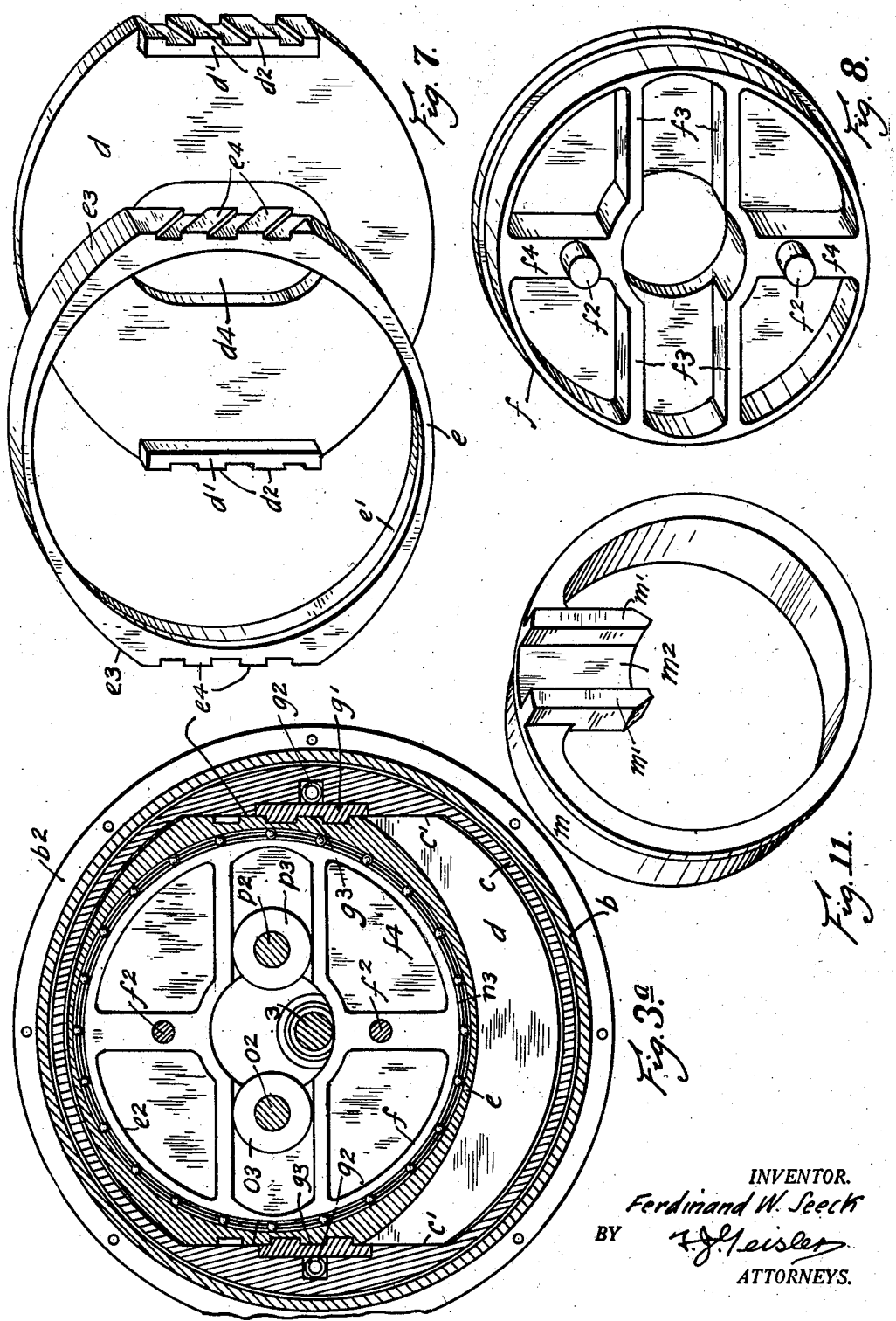
INVENTOR.
Ferdinand W. Seeck
BY
ATTORNEYS.

July 6, 1937.  F. W. SEECK  2,085,770
GEARLESS VARIABLE SPEED TRANSMISSION
Filed Jan. 21, 1936  7 Sheets-Sheet 3
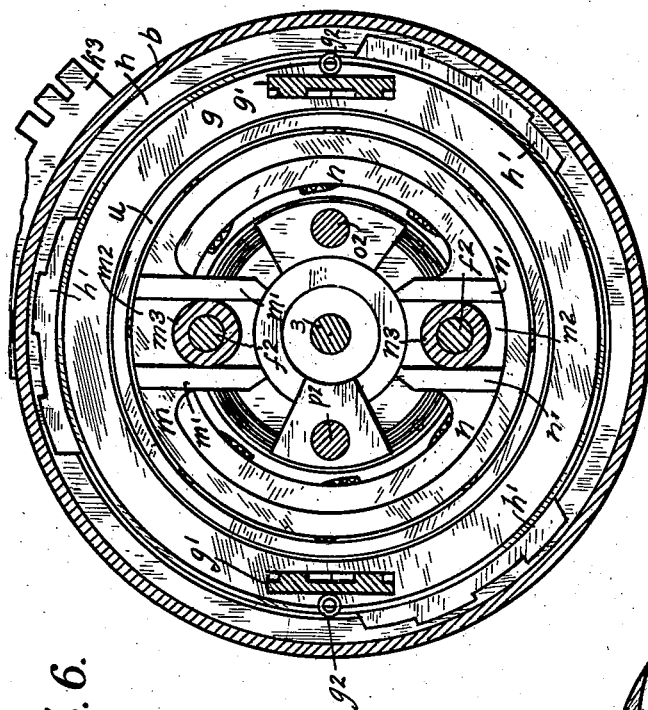
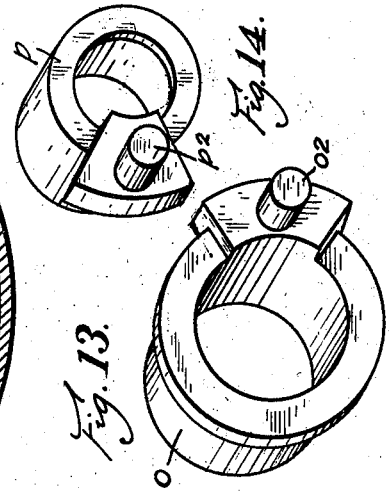
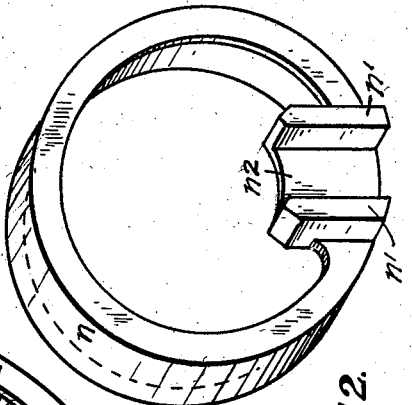
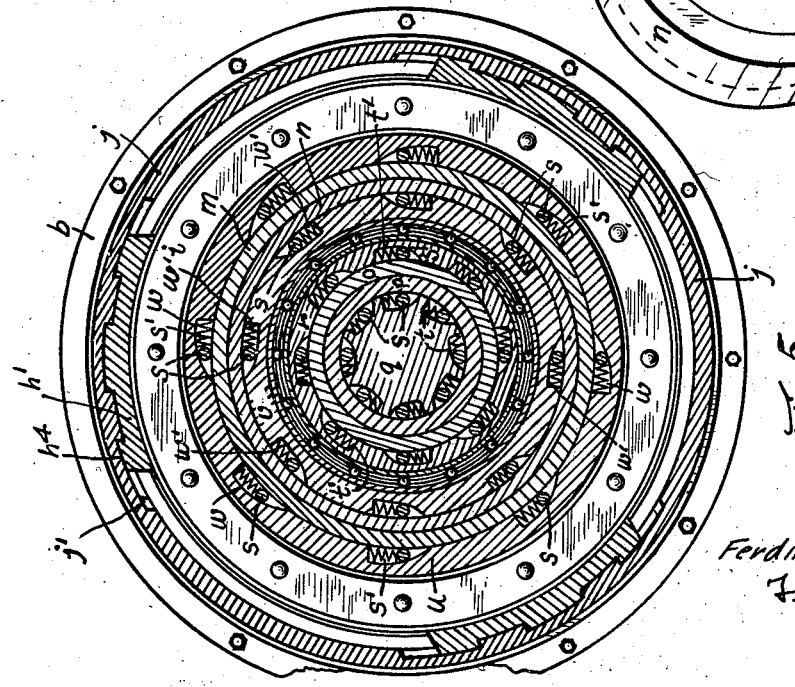
INVENTOR.
Ferdinand W. Seeck
F. J. Geisler
ATTORNEYS.

July 6, 1937.  F. W. SEECK  2,085,770
GEARLESS VARIABLE SPEED TRANSMISSION
Filed Jan. 21, 1936   7 Sheets-Sheet 4
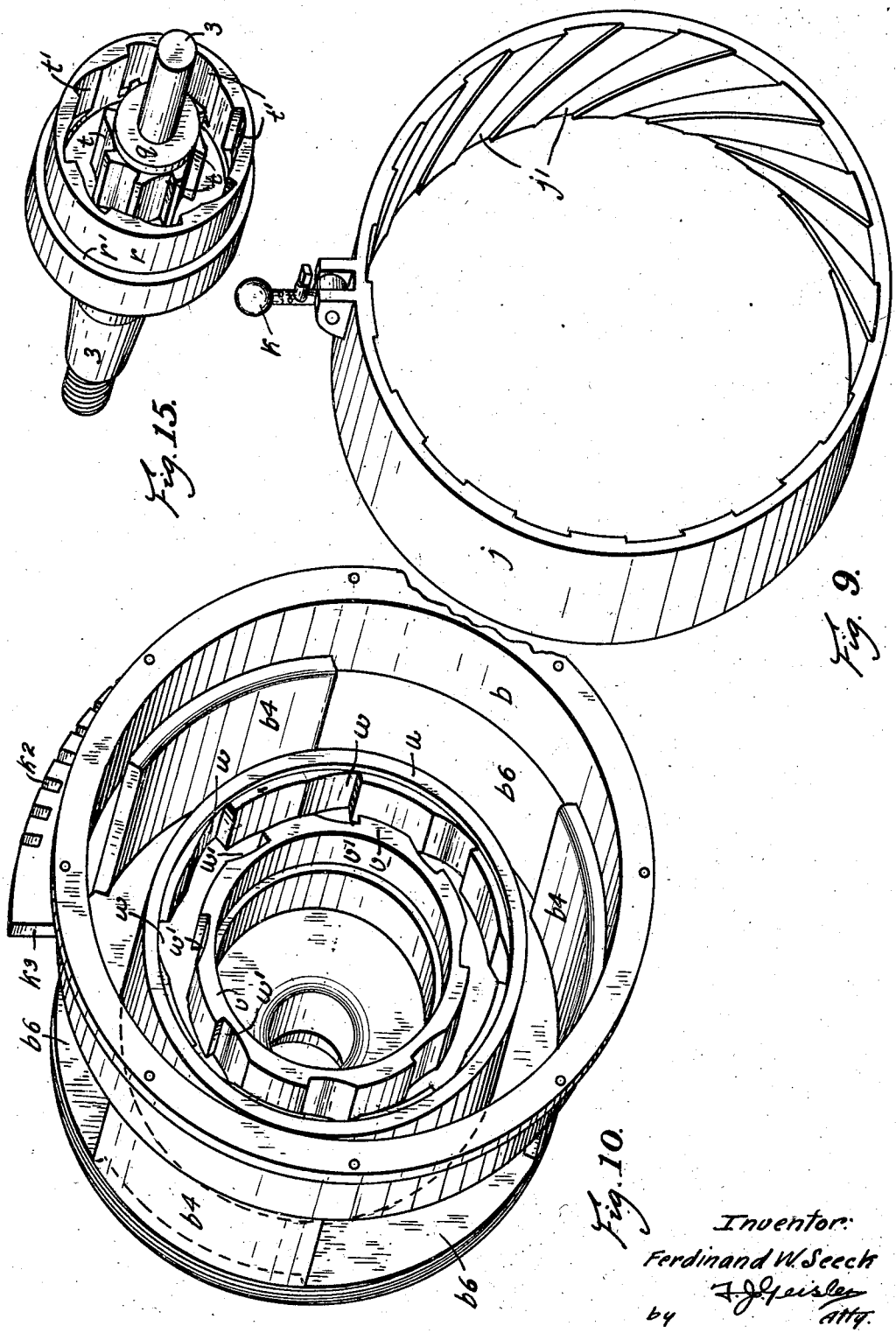
Inventor:
Ferdinand W. Seeck
by F. J. Geisler
Atty.

July 6, 1937.  F. W. SEECK  2,085,770
GEARLESS VARIABLE SPEED TRANSMISSION
Filed Jan. 21, 1936   7 Sheets-Sheet 5
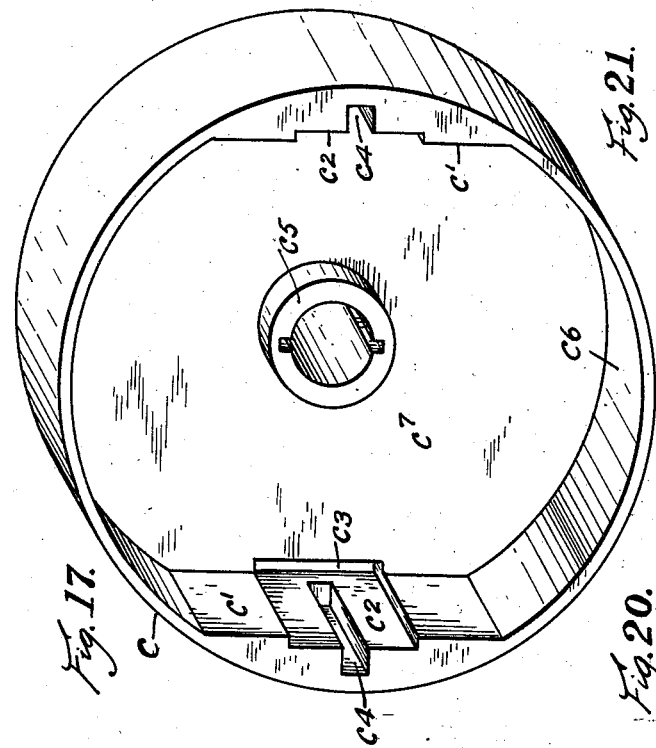
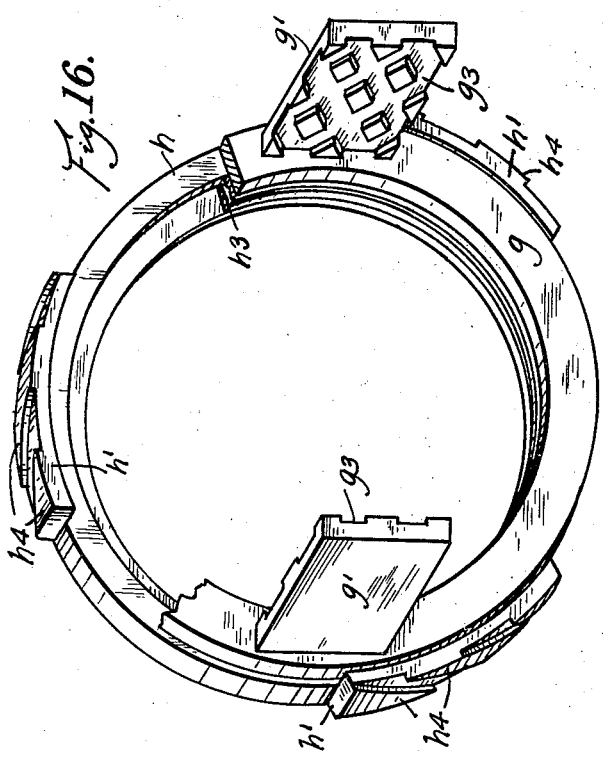
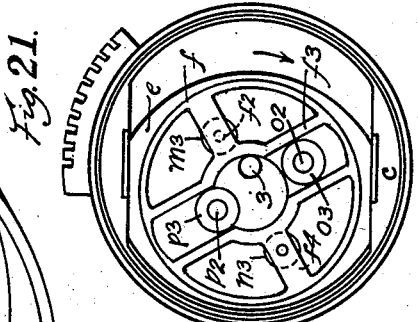
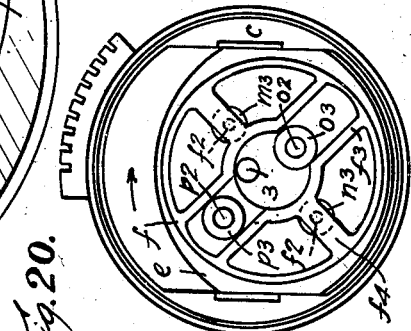
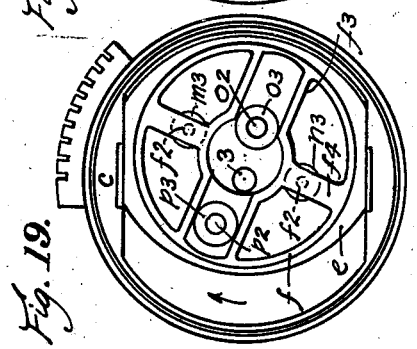
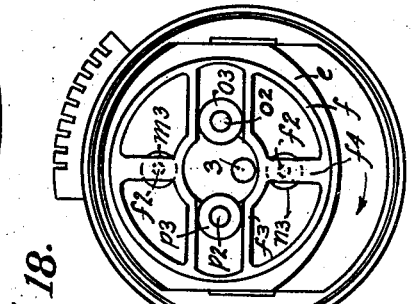
Inventor:
Ferdinand W. Seeck
BY
ATTORNEYS.

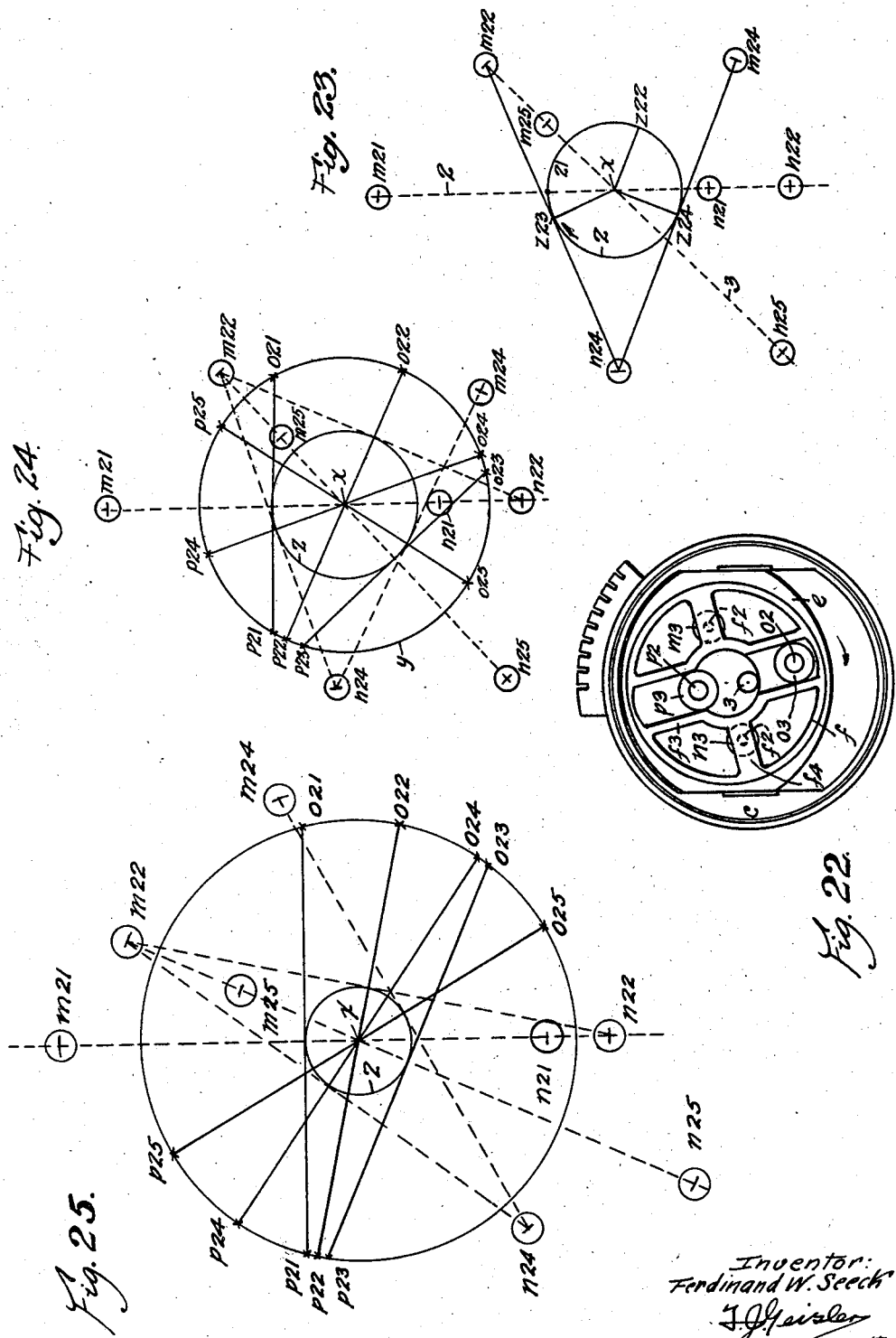

July 6, 1937.   F. W. SEECK   2,085,770
GEARLESS VARIABLE SPEED TRANSMISSION
Filed Jan. 21, 1936   7 Sheets-Sheet 7

Inventor:
Ferdinand W. Seeck
by [signature] Att'y

Patented July 6, 1937

2,085,770

UNITED STATES PATENT OFFICE 2,085,770

GEARLESS VARIABLE SPEED TRANSMISSION

Ferdinand W. Seeck, Lebanon, Oreg.

Application January 21, 1936, Serial No. 60,030

12 Claims. (Cl. 74—69)

One of the principal objects of my invention is to provide a gearless transmission for a one-way motor which is adapted to transmit the driving power, by positive drive, from the driving shaft to the driven shaft at controllable variable speeds, and by means which will not result in a jerky transmission of power from the motor, but instead will cause the driven shaft to be operated evenly, smoothly and quietly.

A further object of my invention is so to arrange the power transmitting elements that the transmission may be varied—gradually increased or diminished—manually and automatically without discontinuing the transmission of power from the motor to the driven shaft of my transmission.

A further object of my invention is to provide a transmission composed of few parts, and these of simple, strong and durable construction and easily arranged in operative assembly.

A further object of my invention is to provide a transmission of compact form so that it may be installed in limited spaces.

The foregoing and incidental features of my invention are hereinafter fully described with reference to the accompanying drawings.

In the drawings:

Fig. 1 (Sheet 1) is an outside view of the casing or housing in which my variable speed power transmission is inclosed, the interior of which housing rotatably supports certain parts of my transmission;

Fig. 2 (Sheet 1) is a vertical section of my transmission, drawn on a larger scale, taken thru the center of Fig. 1; with driving and driven shafts and certain other parts of my transmission shown in full;

Fig. 3 (Sheet 1) is a sectional view showing the interior of my transmission and housing taken on a plane indicated by 3—3 of Fig. 2 and looking in the direction indicated by the arrows;

Fig. 3a (Sheet 2) is a section on a plane indicated by 3a—3a of Fig. 2, but looking in the direction opposite to that of Fig. 3, as indicated by the arrow but showing an active phase of my transmission;

Fig. 4 (Sheet 1) is a horizontal section taken thru the center of Fig. 1 but drawn on the same scale as Figs. 2 and 3, the section corresponding to the plane 4—4 indicated in Fig. 3, looking in the direction pointed by the arrows;

Fig. 5 (Sheet 3) is a vertical section taken on the plane indicated by 5—5 in Figs. 2 and 4 (Sheet 1) and looking in the directions indicated by the arrows, thus in the same direction as Fig. 3;

Fig. 6 (Sheet 3) is a vertical section taken on the plane indicated by 6—6 in Fig. 2, and looking in the directions indicated by the arrows, thus in the same directions as in Figs. 5 and 3;

Figure 24:
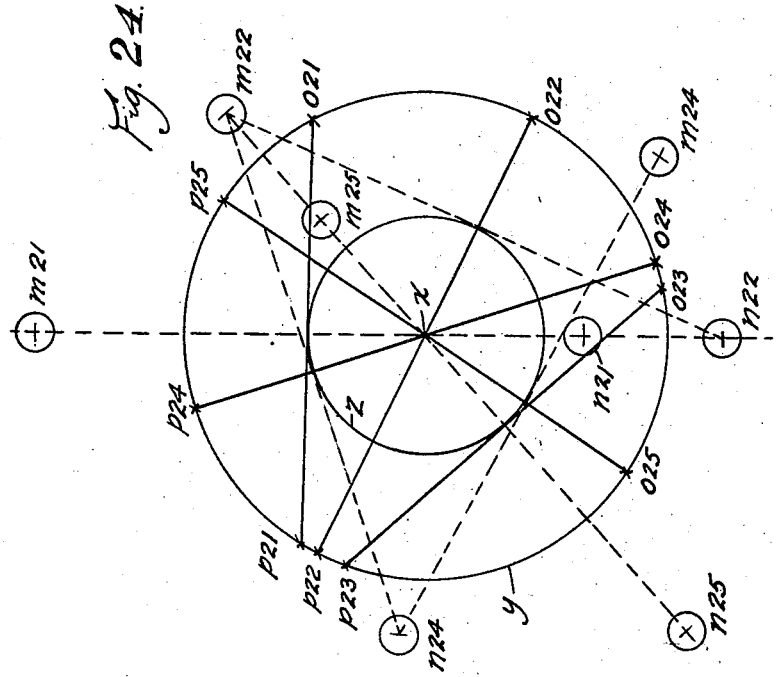

Figs. 7, 8 (Sheet 2), 9, 10 (Sheet 4) 11 (Sheet 2), 12, 13, 14 (Sheet 3), 15, (Sheet 4), 16 and 17 (Sheet 5), are views in perspective of details of my transmission; and Figs. 18, 19, 20, 21 (Sheet 5), 22 (Sheet 7) 23, 24 (Sheet 6) and 25 (Sheet 7) are diagrammatic illustrations of the operation of my transmission.

Referring first to Figs. 1, 2, and 4: The housing or casing of my transmission is divided into two sections $a$ and $b$, rigidly fastened together by bolts $a'$ thru their companion annular flanges $a2$, $b2$. The housing is also rigidly attached to any convenient supporting frame by any suitable means, the means and the supporting frame not being shown in the drawings. The driving shaft 2 is assumed to be operatively connected to a motor. 3 indicates the driven shaft to which power is to be transmitted from driving shaft 2. Suitable bearings are provided as indicated at $b3$, between the rear section $b$ of the housing and the driven shaft 3; and at $a3$ between the front section $a$ of the housing and a cup-shaped transmission member $c$ keyed to the driving shaft 2 (Fig. 17).

The section $b$ of the housing is made with a portion of its periphery inwardly offset as shown at $b4$ in Figs. 1 and 4, to accommodate an annular member $j$ (shown in detail in Fig. 9) mounted thereon. A collar $b5$ threaded on the outer end of the offset portion $b4$ of the housing section $b$ holds the annular member $j$ in place. The annular member $j$ is adapted to be partially rotated in either direction by means of a pivoted lever $k$ (see Figs. 1 and 3).

The lever $k$ is made with a lug $k'$ adapted to be engaged with slots $k2$ provided in a segmental peripheral flange $k3$ integral with housing section $b$ (see details Figs. 3 and 10). The engagement of the lug $k'$ with one of the slots $k2$ thus holds the annular member $j$ against rotation.

The interior of the housing section $b$ is cast with two annular concentric flanges $u$ and $v$ (see Figs. 2 and 4). The inner periphery of the outer flange $u$, and the outer periphery of the inner flange $v$ are made with regularly spaced opposed cam lock recesses $w$, $w'$ (see Fig. 10) extending in the same direction.

The inner end of the driven shaft 3 is provided with a central hub $q$, and a concentric peripheral flange $r$, as shown in Figs. 2, 4, and 15. The opposed faces of the hub $q$, and the inner periphery of the flange $r$ are made with opposed cam lock recesses $t$, $t'$ (see Fig. 15) extending in the same direction. These cam lock recesses correspond with those of the flanges $u$ and $v$ of the housing section $b$ (see Fig. 10), but extend in an opposite direction as shown by Fig. 5.

The central portion of housing section $b$, as shown in Figs. 2 and 4, provides a journal bearing for the driven shaft 3 including ball bearings $b3$, as mentioned. Between the outer periphery of the flange $r$ of shaft 3, and the inner periphery of flange $v$ of the housing section $b$ are ball bearings $v2$, as indicated in Figs. 2 and 4.

Figs. 11, 12, 13, and 14 (Sheets 2 and 3) show views of four annular clutch rings $m$, $n$, $o$, $p$, respectively. The member $n$ (Fig. 12) is rotatably seated in member $m$ (Fig. 11) and the members $m$ and $n$ so assembled are inserted between the cam lock recesses $w$, $w'$ of the flanges $u$ and $v$ of the housing section $b$ (see Figs. 10 and 5); and likewise clutch member $p$ is rotatably seated in member $o$, and the members $o$ and $p$ so assembled are inserted between the cam lock recesses $t$, $t'$ of the center hub $q$ of the driven shaft 3 and its concentric flange $r$ (see Figs. 15 and 5). The described arrangement of the clutch members $m$, $n$ and $o$, $p$ will be seen in Fig. 5.

Within the cam lock recesses $w$, $w'$ of the flanges $u$ and $v$, of case section $b$, and the cam lock recesses $t$, $t'$ of the hub $q$ and hub-flange $r$ of the driven shaft 3 are located rollers $s$ which are normally held towards the contracted ends of said recesses by compression springs $s'$ (see Fig. 5). The rollers $s$ function to engage the clutch member $m$ with the flange $u$, when the clutch member $m$ attempts to turn in one direction, and similarly to engage the clutch member $n$ with the flange $v$ of the case section $b$, when clutch member $n$ attempts to turn in one direction. Thus from Fig. 5 it is apparent that clutch rings $m$ and $n$ may rotate freely, independently, clockwise within case section $b$, but rotation of either or both counterclockwise would cause the cam rollers $s$ to effect the engagement of clutch rings $m$ and $n$ with the flanges $u$, $v$, respectively, of case section $b$.

Similarly, clutch rings $o$ and $p$ are free to rotate, independently, counterclockwise, without engaging with hub $q$ or hub flange $r$ of driven shaft 3, but rotation clockwise of either or both of these clutch rings will effect such engagement and cause the rotation of driven shaft 3 in the same direction.

The clutch rings $o$ and $p$ are provided with pins $o2$ and $p2$, respectively, as shown in Figs. 13 and 14; the pins being so located that both are the same distance from the center, as shown in Fig. 6, and on the pins $o2$ and $p2$ are mounted rollers $o3$ and $p3$, respectively, (Fig. 3).

The clutch rings $m$ and $n$ are each provided with a radial guideway consisting of parallel guide flanges $m'$ and $n'$, see Figs. 11 and 12, extending inward from their perimeters, and joined respectively by webs $m2$ and $n2$.

An equalizing or coupling ring $f$ (Fig. 8) is made with radial guideways comprising guide flanges $f3$, in which guideways the rollers $o3$ and $p3$, mounted on the pins $o2$, $p2$ of the clutch rings $o$, $p$, respectively, travel, as shown in Figs. 3 and 3a.

Coupling ring $f$ is further made with two opposite radial ribs $f4$, integral with the flanges $f3$, and perpendicular therewith, as shown in Figs. 3a and 8. These radial ribs $f4$ have pins $f2$ located equal distances from the center, and on these pins are mounted rollers $m3$ and $n3$, respectively, the roller $m3$ traveling in the guideway $m'$ of clutch ring $m$, and the roller $n3$ traveling in guideway $n'$ of clutch ring $n$. (See Figs. 3 and 6.)

An annular cup-shaped transmission member $c$, shown by Fig. 17, is keyed to the driving shaft 2 (see Figs. 2 and 4) and thus rotates with it.

The interior of the cylindrical wall $c6$ of transmission member $c$, as shown in Fig. 17, is made with two equal, opposite plane-face surfaces $c'$ parallel to each other, and perpendicular to the diameter drawn to their centers, and both surfaces are made with central rectangular recesses $c2$. Rectangular openings $c3$ extend thru the transverse wall $c1$ of said transmission member $c$, and slots $c4$ are provided in the middle of the rectangular recesses $c2$. In the rectangular recesses $c2$, and the openings $c3$ in the transverse wall $c1$ of member $c$ bear, slidably, the perpendicular arms $g'$ of the ring or annular actuating plate $g$, shown in Fig. 16. Actuating plate $g$ thus rotates with transmission member $c$, but at the same time may be moved in and out relatively to the transverse wall $c1$ of transmission member $c$.

Coil springs $g2$, see Fig. 4, are placed on the slots $c4$ of transmission member $c$, with one end bearing against the face of the actuating plate $g$. These coil springs $g2$ normally space the actuating plate $g$ from transmission member $c$. The inner faces of the arms $g'$ of actuating plate $g$ (see Fig. 16) are made with rectangular oblique cross grooves or guideways $g3$.

Within transmission member $c$ and between the connecting arms $g'$ of actuating plate $g$ is placed the elliptical plate $d$ (see Fig. 7) which I designate a balance plate.

This elliptical balance plate $d$ terminates at its opposite ends in parallel planar portions $d'$ corresponding with the interior plane faces $c'$ of transmission member $c$, and the planar portions $d'$ are provided with rectangular, parallel, oblique guide ribs $d2$, adapted to slide in the guide elements $g3$ of the arms $g'$ of actuating plate $g$.

Said balance plate $d$ is further made with an elongate central opening $d4$ for receiving the interior central boss $c5$ of transmission member $c$, and so as to permit the relative free linear movement of the balance plate with reference to the boss $c5$.

Within transmission member $c$ is also located an elliptical ring, or coupling member $e$ (Fig. 7), the interior face $e'$ of which is circular, and the outer face $e3$ elliptical, which outer face $e3$ corresponds with the rim face of the balance plate $d$, and is of the same size. The opposite outer parallel plane faces of coupling member $e$ are grooved so as to produce rectangular parallel obliquely sloping guide ribs $e4$ running in opposite direction to the guide ribs $d2$ of balance plate $d$. Both the balance plate $d$ and the companion coupling member $e$ slide in the grooves $g3$ of the arms $g'$ of actuating plate $g$; but the movement of actuating plate $g$ towards and from transmission member $c$ will cause balance plate $d$ and coupling member $e$ to move in opposite directions, in parallel vertical planes.

The coupling ring $f$ (Fig. 8) is rotatably supported within coupling member $e$, and suitable ball bearings $e2$ are interposed between these parts as seen in Figs. 2, 3, and 4.

An annular positioning plate $h$ (see Fig. 16) bears on actuating plate $g$, there being ball bearing $h3$ between them, see Figs. 2 and 4. The outer periphery of plate $h$ is provided with equally spaced peripheral segmental flanges $h'$.

The set-in wall $b4$ of housing section $b$ has spaces $b6$ (see Fig. 10) thru which spaces said flanges $h'$ of positioning plate $h$ project. The outer faces of said flanges $h'$ are made with spiral ribs $h4$ constituting guide-elements, which thread in the spiral grooves $j'$ provided on the inner periphery of member $j$. (Compare Figs. 2, 9, and 16.)

By the spiral rotation of member $j$, by hand lever $k$, positioning plate $h$ may be spirally moved inward towards member $c$, moving with it the actuating plate $g$. Since the guide elements $g3$ on the inner faces of arms $g'$ of the actuating plate $g$ cooperate with guide elements $d2$, $e4$ of balance plate $d$ and transmission member $e$, respectively, therefore, the movement of the actuating plate $g$ inward causes the said members $d$ and $e$ to be moved radially inward in opposite directions, and to become inactively positioned, that is, concentric with the axis of rotation of member $c$, as shown at Fig. 3. When, by means of hand lever $k$, the member $j$ is given a partial rotation in the opposite direction moving positioning plate $h$ away from transmission member $c$, the pressure of springs $g2$ will normally cause the actuating plate $g$ also to follow positioning plate $h$ in moving away from member $c$, which movement in turn will cause members $d$ and $e$ to return towards their eccentric positions. Also, depending largely upon the speed of the motor, the pull of centrifugal force on members $d$ and $e$ particularly on the former, will aid the springs $g2$ in moving actuating plate $g$ away from member $c$. This particular feature is mentioned later.

The arms $g'$ of actuating plate $g$ (Fig. 16) bear in recesses $c2$ and project thru slots $c3$ of transmission member $c$ (see Fig. 17), and thus actuating plate $g$ rotates with member $c$. Positioning plate $h$ does not rotate with actuating plate $g$ and is separated from the latter by ball bearings $h3$ as mentioned.

Operation.—When balance plate $d$ and coupling member $e$, and with the latter the coupling ring $f$, register concentrically with the axis of rotation of primary transmission member $c$, in the position as shown by Fig. 3, my transmission is idling; the primary transmission member $c$, coupling member $e$, and actuating plate $g$ merely idling about the coupling ring $f$, without causing any movement of the latter. It is assumed the driving shaft $2$, the transmission member $c$, balance plate $d$, coupling member $e$, and actuating plate $g$ are being rotated in a clockwise direction as viewed in Fig. 3.

From the idling, or neutral position just described and illustrated in Fig. 3, let it be assumed that, thru the manipulation of lever $k$, and member $j$ and the action of springs $g2$, the members $h$, $g$, and $e$ are placed in their active position, as previously explained, and the coupling ring $f$ is thrown into extreme eccentric, active position, for example as indicated in Fig. 18. The coupling ring $f$ will then no longer be concentric with transmission member $c$, and it will be apparent that now, as transmission member $c$ rotates in a clockwise direction, as indicated by the arrow in Fig. 18, the center of the coupling ring $f$ will revolve in a circular path about the axis of rotation of primary transmission member $c$, and coupling ring $f$ similarly will follow a circular path. As transmission member $c$ rotates in a clockwise direction, from its position in Fig. 18 to that indicated in Fig. 19, the coupling ring $f$ is moved slightly to the right and slightly downward from its position of Fig. 18, and as member $c$ continues its rotation from the position in Fig. 19 to that in Fig. 20, coupling ring $f$ is moved downward and to the left, and then, from the position in Fig. 20 to that in Fig. 21, coupling ring $f$ is moved upward and to the left, and so on.

Now, as coupling ring $f$ is moved from the position in Fig. 18 to that in Fig. 19, that is to the right and downward, it tends to move the rollers $m3$ and $n3$, carried on pins $f2$ of coupling ring $f$, to the right. Moving roller $m3$ to the right will cause clutch ring $m$ to be turned clockwise, since the roller $m3$ bears in the guideway $m'$ of clutch ring $m$. Similarly, moving roller $n3$ to the right, when $n3$ is in the position shown in Fig. 18, would cause clutch ring $n$ to be turned in a counterclockwise direction. Now, referring to Fig. 5, it is apparent that clutch ring $m$ is free to turn in a clockwise direction, but that clutch ring $n$ cannot turn in a counterclockwise direction, since such movement would cause clutch ring $n$ to bind with flange $v$, thru the rollers $s$ in the cam-lock recesses $w'$. Consequently, as coupling ring $f$ is moved from the position in Fig. 18 to that in Fig. 19, the roller $n3$ is held against movement to the right, with the result that the coupling ring $f$ is forced to turn or rotate slightly in a clockwise direction. From the position in Fig. 19 the coupling ring $f$ moves downward and to the left to the position shown in Fig. 20. During this change of position the coupling ring $f$ tends to move the rollers $m3$ and $n3$ to the left; but moving roller $m3$ to the left would cause clutch ring $m$ to be turned in a counterclockwise direction, and, as apparent from Fig. 5, clutch ring $m$ cannot turn in a counterclockwise direction, since this would cause clutch ring $m$ to bind with flange $u$ thru the rollers $s$ in the cam-lock recesses $w$. On the other hand, moving roller $n3$ to the left will cause clutch ring $n$ to be turned in a clockwise direction, which it is free to do as evident from Fig. 5. Consequently, during this phase the roller $m3$ is held against movement to the left, thereby forcing the coupling ring to rotate slightly further in a clockwise direction.

In a similar manner, by following the paths of the coupling ring $f$ and the rollers $m3$ and $n3$ thru the various positions indicated in the Figs. 18 to 22, it will be found that rollers $m3$ and $n3$ alternately hold, and thus alternately force the coupling ring $f$ to make a further partial rotation in a clockwise direction. The result is that as long as coupling ring $f$ remains in its eccentric position, and thus revolves in a circular path while transmission member $c$ and the driving shaft $2$ (on which transmission member $c$ is keyed) rotate, the coupling ring $f$ itself is also forced to rotate in a clockwise direction, but at a slower rate of speed than the rotation of $c$.

The manner in which coupling ring $f$ is rotated by the cooperation of the rollers $m3$, $n3$ and the clutch rings $m$ and $n$ is further illustrated with reference to Fig. 23.

Figure 23:
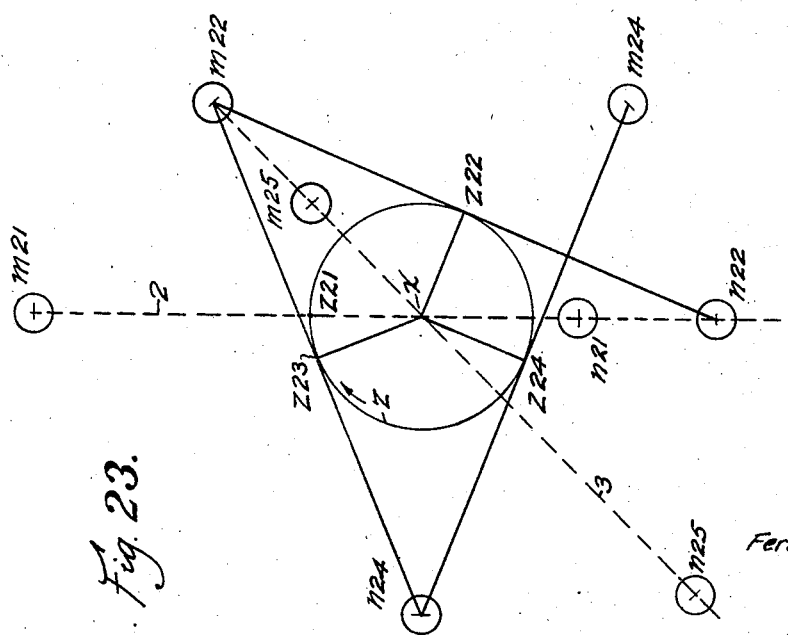

In Fig. 23, $x$ indicates the coinciding centers of rotation of driving shaft $2$, driven shaft $3$, and rotating member $c$ (fast on driving shaft $2$ as above described). In the various positions of the coupling ring $f$ shown in Figs. 18 to 22, the center of said coupling ring, due to its eccentric position, follows a circular path, which is indicated by the circle $z$ in Fig. 23. Since the rollers $m3$ and $n3$ are mounted on the pins $f2$ of the alined radial ribs $f4$ (Fig. 8) of the coupling ring $f$, it is obvious that a line connecting the centers of $m3$ and $n3$ must always pass thru the center of the coupling ring $f$; in other words, such line must always intersect or touch the circle $z$. When the coupling ring $f$ is in the position shown in Fig. 18, rollers $m3$ and $n3$ are in vertical alinement, as indicated in Fig. 23 by the points $m21$ and $n21$, and the center of the ring $f$ is at the point $z21$. As center of the coupling ring $f$ moves in a clockwise direction about the circle $z$, $n3$, being prevented by clutch member $n$ from moving to the right, moves downward on line 2 in the guideway $n'$ of clutch member $n$, and $m3$ moves to the right, as previously explained with reference to Fig. 19. It is obvious that $m3$ will continue to be pushed to the right until the center of $f$ has moved around to the position $z22$, by which time $m3$ will have moved to the position of $m22$, and the line $n22$—$m22$ will be tangent to the circle $z$ at the point $z22$. The center of $f$ continues moving in a clockwise direction; $m3$ is held by clutch member $m$ against movement to the left, but $n3$ can now slip in clockwise direction and will continue moving until the center of $f$ reaches the point $z23$ and $n3$ reaches the point $n24$, the line $n24$—$m22$ being tangent to circle $z$ at $z23$. During this interval roller $m3$, sliding in the guideway $m'$ of clutch member $m$, has moved down and back on the line 3. Now clutch member $n$ again holds and roller $m3$ slips clockwise from point $m22$ to point $m24$ until the center of coupling ring $f$ reaches point $z24$, and so on. By simple geometrical proof, angles $n22$—$m22$—$n24$ and $m22$—$n24$—$m24$ are equal, arcs $z22$—$z23$ and $z23$—$z24$ (measured in clockwise direction) are equal. Furthermore, it is obvious that, since the center of $f$ moves at uniform speed around circle $z$, $n3$, moving from point $n22$ to $n24$ while the center of $f$ moves from $z22$ to $z23$, moves fastest at the center of its arc, that is, at the point $n25$, and slows down again to a state of rest at $n24$. (When $n3$ is at point $n25$, $m3$ has slid down to point $m25$.)

From this illustration, the following correct deductions are to be made regarding the relative movements of clutch rings $m$ and $n$ and the corresponding rollers $m3$ and $n3$ carried by the coupling ring $f$ (as long as the circle $z$ in which the center of $f$ moves at uniform speed remains the same): rollers $m3$ and $n3$ are each held alternately while the other moves; the periods of holding and moving are always the same; each moves alternately thru an equal distance in an equal period of time, beginning slowly, moving at the fastest rate of speed at the middle of each period and then slowing down.

Thus rollers $m3$ and $n3$, by being alternately held, cause the rotation of coupling ring $f$ in a clockwise direction. Since $f$ is caused to rotate, the rollers $o3$ and $p3$ and with them the clutch rings $o$ and $p$ are also turned in clockwise direction by $f$ as indicated in Figs. 18 to 22. It is apparent from Fig. 5 that if clutch ring $o$ moves in clockwise direction, it will engage with the hub flange $r$ due to the locking action of the rollers $s$ in the cam-lock recesses $t'$ of the flange $r$. Similarly, if clutch ring $p$ moves in clockwise direction, it will engage with the hub $q$ thru the locking action of the rollers $s$ in the cam-lock recesses $t$ of hub $q$. Thus, if either clutch ring $o$ or clutch ring $p$ turns in clockwise direction, it will force the driven shaft 3 to rotate with it in a clockwise direction. If both clutch rings $o$ and $p$ are turning at different rates of speed, in a clockwise direction, whichever one is turning the faster at the particular moment will be driving the shaft 3 at that particular speed. The pins $o2$, $p2$ thus function alternately as crank pins for the driven shaft 3.

The relative movements of the rollers $o3$ and $p3$, that is the movements of the crank pins $o2$, $p2$, as indicated in Figs. 18 to 22, may be illustrated in connection with the movements of rollers $m3$ and $n3$ by referring to Fig. 24.

In Fig. 24 the center $x$, circle $z$, and points to which rollers $m3$ and $n3$ move are the same as indicated in Fig. 23. Due to the construction of clutch members $o$ and $p$ (Figs. 13 and 14) the pins $o2$, $p2$ and therefore the rollers $o3$, $p3$ mounted thereon are equi-distant from the center of rotation of the shafts 2 and 3 and transmission member $c$, that is, are both equi-distant from center $x$ (Fig. 24), and therefore move around $x$ in a circular path $y$, as coupling ring $f$ rotates. It is obvious from the construction of the coupling ring $f$ (Fig. 8), with its webs $f3$ and radial ribs $f4$, that the line connecting the centers of rollers $o3$ and $p3$ will always pass thru the center of coupling ring $f$, that is will always intersect or touch circle $z$ in Fig. 24, and furthermore, will always be perpendicular to the line passing from the center of $m3$ to the center of $n3$.

In Fig. 24 when rollers $n3$ and $m3$ are at the points marked $m21$ and $n21$, rollers $o3$ and $p3$ will be at the points indicated by $o21$ and $p21$, that is the line $o21$—$p21$ must be perpendicular to the line $m21$—$n21$ at a point where it intersects the circle $z$. Now $n3$ is held against movement to the right and slides downward to the position indicated by $n22$, and $m3$ moves to the point $m22$, as in Fig. 23. Under this condition rollers $o3$ and $p3$ must move to such points as $o22$ and $p22$, respectively,—that is the line $o22$—$p22$ must be perpendicular to the line $m22$—$n22$ at the point where the latter line touches the circle $z$, and the line $o22$—$p22$ must go thru the center $x$. At this phase $m3$ is held at $m22$ against movement to the left, as explained with reference to Fig. 23, and $n3$ then slides clockwise from $n22$ until it comes to rest at $n24$. When $n3$ reaches the middle point of its arc $n22$—$n24$, at the point $n25$, and is therefore traveling fastest, $o3$ and $p3$ are in the positions $o23$ and $p23$, respectively, since the line $o23$—$p23$ must be perpendicular to the line $m25$—$n25$. Similarly, when $n3$ reaches the point $n24$, $o3$ and $p3$ will be in the positions of $o24$ and $p24$, respectively.

By simple geometric proof it can be shown that arc $o22$—$o23$ equals arc $p23$—$p24$, and equals arc $o21$—$o22$, and that arc $o23$—$o24$ equals arc $p22$—$p23$, and so on.

Thus when $n3$ moves from point $n22$ to point $n25$, $o3$ moves from point $o22$ to point $o23$ and $p3$ slides back from point $p22$ to point $p23$; then, as $n3$ continues to move from point $n25$ to point $n24$, $o3$ slides back from point $o23$ to point $o24$ and $p3$ moves from point $p23$ to point $p24$. When $n3$ is moving fastest (i. e. at point $n25$ at the center of its arc $n22$—$n24$) $o3$ has slowed down and $p3$ begins to move forward and moves thru an equal distance in the same length of time as $o3$ had done previously.

When the coupling ring $f$ is rotating fastest, that is when either of $m3$ or $n3$ is moving fastest, it is driving rollers $o3$ or $p3$, and therewith clutch rings $o$ and $p$ and driven shaft 3 the slowest, altho always at a speed greater than $f$, and when the coupling ring $f$ is turning the slowest the reverse is true. In this way the coupling ring $f$ produces a resulting equalizing effect on the speeds at which rollers $o3$ and $p3$ and therewith clutch rings $o$ and $p$ alternately are driven, and thus on the speed at which shaft 3 is driven.

In other words, when clutch ring $n$ begins to move, clutch ring $o$ is driving shaft 3 and is moving at its greatest speed; $o$ decreases, $n$ increases; when $n$ reaches its greatest speed, and $o$ has slowed down, clutch ring $p$ in turn begins to drive shaft 3 and begins to increase its speed and continues to increase, while $n$ decreases, until $p$ reaches its greatest speed, when $n$ comes to rest and $m$ begins to move; then $m$ increases as $p$ decreases, etc. Since the periods of movement of $m$ and $n$ and the arcs thru which they move are always the same (so long as the coupling ring $f$ remains in the same eccentric position) there is perfect synchronization, by means of the coupling ring $f$, among the clutch elements $m$, $n$, $o$, and $p$,—which constitutes the most important feature of my invention.

When the driving shaft 2 is rotating rapidly the succession of driving impulses imparted to the driven shaft 3 by the clutch rings $o$ and $p$ alternately causes the latter to be given very smooth running motion.

Figs. 18, 19, 20, 21, and 22 illustrate the operation when the coupling ring $f$ is in extreme eccentric position. In this position the driven shaft 3 is given its greatest rate of speed. If the coupling ring $f$ be moved into less eccentric position, the clutch rings $m$, $n$, $o$, and $p$ would of course be rotated in shorter arcs, and the coupling ring $f$ would rotate more slowly. In such case the speed of the driven shaft 3 would be correspondingly reduced. Thus by adjusting the eccentricity of the coupling ring $f$, by means of hand lever $k$, as above described,—relatively to the axis of rotation of driving shaft 2—the speed of the driven shaft 3 may be controlled.

Due to the relative sizes of the parts of my transmission, and as apparent from Figs. 18 to 22, the coupling ring $f$ rotates approximately a quarter of a turn while the transmission member $c$ rotates one complete turn. But by making the latter member $c$ and coupling member $e$, and the cooperating parts of my transmission relatively larger than the coupling ring $f$, it is possible to provide a construction which causes member $f$ to rotate more rapidly, and thus drive driven shaft 3 at a correspondingly greater speed.

In Fig. 24, $m3$ and $n3$ are illustrated as being a greater distance apart than the diameter of the circle in which $o3$ and $p3$ move. I have found it most satisfactory to have the ratio of the distance between $o2$ and $p2$ and the distance between the pins $f2$ of the rollers $m3$ and $n3$ (see Fig. 6) of approximately the proportion of 6 to 7. However, the proportion may be varied and my invention is not to be understood as limited to any specific dimensions or relative proportions. But it is necessary in my invention that $o2$ and $p2$ should be equi-distant from the axes of rotation of shafts 2 and 3, and that $m3$ and $n3$ should be equi-distant from the center of $f$; also, of course, that $o2$ and $p2$ should be diametrically opposite each other, that $m3$ and $n3$ should be diametrically opposite each other, and that the line connecting $o2$ and $p2$ should be perpendicular to the line connecting $m3$ and $n3$.

In Figs. 23 and 24 the circle $z$ described by the center of $f$ is comparatively large, that is to say, the coupling ring $f$ has been moved into very eccentric position. Fig. 25 illustrates the action of the clutch members when $f$ is in less eccentric position, that is, when the circle $z$ described by the center of $f$ is smaller. The same characters are used to designate the positions of $m3$, $n3$, $o3$, and $p3$ in Fig. 25 as in Figs. 23 and 24, and the same observations regarding the relative movements of $m3$, $n3$, $o3$, and $p3$ may be made. It will be noticed, however, that the distances of travel of the driving elements $o3$ and $p3$ (and also of $m3$ and $n3$) are considerably less. In other words, the speed with which shaft 3 is driven thru the medium alternately of clutch members $o$ and $p$ has been reduced by decreasing the eccentric position of the ring $f$. But the synchronization of the various clutch members has in no way been disturbed.

The manipulation of the hand lever $k$ acts, thru the intermediary of various members in the manner already described, to limit the eccentricity of the coupling ring $f$ and thus to control the speed at which the shaft 3 can be driven. However, an important feature of my transmission is that the speed control is also to a large extent automatic. It has been assumed, for the sake of simplicity in explaining the movement of the clutch rings and coupling ring of my transmission, that the coupling ring $f$ is moved from its idling or neutral position immediately into extreme active eccentric position. Actually this would not occur, particularly if there were a relatively heavy pull on the driven shaft 3, and such sudden movement of coupling ring $f$ into extreme eccentric position would tend to stall the engine and would at best result in an undesirable jerk and strain on the transmission and motor. But when it is attempted by such manipulation of the lever $k$ to move the coupling ring $f$ from neutral to extreme eccentric position, the resistance set up by the shaft 3 tends to oppose the action of the springs $g2$ in forcing the actuating plate $g$ away from transmission member $c$ and in moving the balance plate $d$, member $e$ and coupling ring $f$ into eccentric position. As a result of this resistance, these members do not immediately move into extreme eccentric position, but move first into slightly eccentric position causing the shaft 3 thus to be driven slowly at the start. At the same time the pull of centrifugal force on the members which are in slightly eccentric position, particularly the centrifugal pull on balance plate $d$, assists the action of the springs $g2$ in moving the members further into eccentric position. The initial resistance imposed by the driven shaft 3 is also reduced as its speed increases. Thus gradually the maximum speed permitted by the position at which the lever $k$ has been set is attained. In a similar manner, when shaft 3 is being driven at maximum speed, a sudden heavy pull on the driven shaft 3, forcing the motor to labor and slow down, and reducing the centrifugal pull on the eccentric members will serve to oppose the action of the springs $g2$ in keeping the actuating plate $g$ spaced from primary transmission $c$ and result in the eccentricity of members $d$, $e$, and $f$ being reduced and thereby reducing the speed of shaft 3 in comparison with the speed of the motor. Then, as the motor speeds up, the eccentricity again tends to be increased, thereby again increasing the speed at which the shaft 3 is driven.

My construction shows a pair of clutch members ($m$ and $n$) alternately holding and forcing the coupling ring $f$ to rotate when in eccentric position, and another pair of clutch members ($o$ and $p$) alternately acting to cause the driven shaft 3 to be rotated. It would be possible to increase the number of the clutch members in each of the two sets by changing the construction so as to provide additional concentric flanges or surfaces for the additional clutch members, and by changing the construction of the coupling ring f accordingly. For example, if four clutch members were provided in each set, with two additional concentric flanges on both the interior of housing section b and the inner end of driving shaft 3, coupling ring f would be made with four radial ribs f4 instead of two as shown, such radial ribs being equally spaced, in such case at right angles to each other, and coupling ring f would similarly be made with four radial guideways formed by guide flanges f3 instead of two such guideways as shown, the radial guideways being also equally spaced with reference to each other, and with reference to the radial ribs f4, thus a radial guideway between each pair of radial ribs. The action would be similar to that already described, the clutch members in each set functioning alternately.

I have illustrated and described an efficient form of construction for carrying my invention into effect, but do not wish to be limited to the precise details of construction set forth, since these may be varied; and mere modifications of the elements of the following claims within the scope of my invention are intended to be included.

I claim:

1. A gearless variable speed transmission comprising a divided case, a driving shaft journaled in one section of said case and a driven shaft journaled in the other section of said case; a primary transmission member fast on said driving shaft; a coupling member carried by said primary transmission member and movable into and out of eccentricity with the axis of rotation of said primary transmission member, thus into and out of active position; a coupling ring carried by said coupling member; the section of the case in which the driven shaft is journaled provided with spaced concentric surfaces, and said driven shaft within said case provided with similar spaced, concentric surfaces; clutch rings located between said concentric surfaces; means, cooperating with said concentric surfaces, holding said clutch rings against rotation in one direction independently of said surfaces; said coupling ring and said clutch rings operatively connected, said connection adapted, thru the medium of the members of one set of said clutch rings, acting alternately, to cause said coupling ring, when in its eccentric position, to rotate in one direction, and thereby to transmit driving motion to the driven shaft thru the medium of the members of the other set of said clutch rings, acting alternately; and a manually operated control for the movement of said coupling member and therewith said coupling ring into and out of eccentric, active position.

2. A gearless variable speed transmission comprising a divided case, a driving shaft journaled in one section of said case and a driven shaft journaled in the other section of said case; a primary transmission member fast on said driving shaft; a coupling member carried by said primary transmission member and movable into and out of eccentricity with the axis of rotation of said primary transmission member, thus into and out of active position; a coupling ring carried by said coupling member; the section of the case in which the driven shaft is journaled provided with two spaced, opposed concentric surfaces, and said driven shaft within said case provided with two similar spaced, opposed concentric surfaces; a pair of clutch rings located between each of the two opposed concentric surfaces; means, cooperating with said concentric surfaces, holding said clutch rings against rotation in one direction independently of said surfaces; said coupling ring and said clutch rings operatively connected, said connection adapted, thru the medium of the members of one pair of said clutch rings, acting alternately, to cause said coupling ring, when in its eccentric position, to rotate in one direction, and thereby to transmit driving motion to the driven shaft thru the medium of the members of the other pair of said clutch rings, acting alternately; a manually operated control including a spring controlled actuating plate reciprocable axially relatively to said primary transmission member, and connections between said actuating plate and said coupling member adapted to cause the movement of said coupling member, and with it said coupling ring into and out of eccentric position.

3. A gearless variable speed transmission comprising a divided case, a driving shaft journaled in one section of said case and a driven shaft journaled in the other section of said case; a primary transmission member fast on said driving shaft; two members carried by said primary transmission member and oppositely movable into and out of eccentricity with the axis of rotation of said primary transmission member, one of said members constituting a coupling member and the other constituting a balance plate; a coupling ring carried by said coupling member; the section of the case in which the driven shaft is journaled provided with spaced concentric surfaces, and said driven shaft within said case provided with similar spaced concentric surfaces; clutch rings located between said concentric surfaces; means, cooperating with said concentric surfaces, holding said clutch rings against rotation in one direction independently of said surfaces; said coupling ring and said clutch rings operatively connected, said connection adapted, thru the medium of the members of one set of said clutch rings, acting alternately, to cause said coupling ring, when in its eccentric position, to rotate in one direction, and thereby to transmit driving motion to the driven shaft thru the medium of the members of the other set of said clutch rings, acting alternately; a manually operated control including a spring controlled actuating plate reciprocable axially relatively to said primary transmission member, and connections between said actuating plate and said balance plate and said coupling member adapted to cause the movement of said balance plate and said coupling member, and with the latter said coupling ring, into and out of eccentric position.

4. A gearless variable speed transmission comprising a divided case, a driving shaft journaled in one section of said case and a driven shaft journaled in the other section of said case; a primary transmission member fast on said driving shaft; a coupling member carried by said primary transmission member and movable into and out of eccentricity with the axis of rotation of said primary transmission member, thus into and out of active position; a coupling ring carried by said coupling member; the section of the case in which the driven shaft is journaled provided with two spaced opposed concentric surfaces, and said driven shaft within said case provided with two similar spaced, opposed concentric surfaces; a pair of clutch rings located between each of the two opposed concentric surfaces; means, cooperating with said concentric surfaces, holding said clutch rings against rotation in one direction independently of said surfaces; said coupling ring and said clutch rings operatively connected by cooperating crank pin elements and guideways, said connection adapted, thru the medium of the members of one pair of said clutch rings, acting alternately, to cause said coupling ring, when in its eccentric position, to rotate in one direction, and thereby to transmit driving motion to the driven shaft thru the medium of the members of the other pair of said clutch rings, acting alternately; a manually operated control for the movement of said coupling member and therewith said coupling ring into and out of eccentric, active position.

5. A gearless variable speed transmission comprising a divided case, a driving shaft journaled in one section of said case and a driven shaft journaled in the other section of said case; a primary transmission member fast on said driving shaft; a coupling member carried by said primary transmission member and movable into and out of eccentricity with the axis of rotation of said primary transmission member, thus into and out of active position; a coupling ring carried by said coupling member; the section of the case in which the driven shaft is journaled provided with spaced concentric surfaces, and said driven shaft within said case provided with similar spaced concentric surfaces; clutch rings located between said concentric surfaces; means, cooperating with said concentric surfaces, holding said clutch rings against rotation in one direction independently of said surfaces; said coupling ring and said clutch rings operatively connected, said connection adapted, thru the medium of the members of one set of said clutch rings, acting alternately, to cause said coupling ring, when in its eccentric position, to rotate in one direction, and thereby to transmit driving motion to the driven shaft thru the medium of the members of the other set of said clutch rings, acting alternately; a manually operated control including a spring controlled actuating plate reciprocable axially relatively to said primary transmission member, and connections between said actuating plate and said balance plate and said coupling member adapted to cause the movement of said balance plate and said coupling member, and, with the latter, said coupling ring into and out of eccentric position.

6. A gearless variable speed transmission comprising a divided case, a driving shaft journaled in one section of said case and a driven shaft journaled in the other section of said case; a primary transmission member fast on said driving shaft; a coupling member carried by said primary transmission member and movable into and out of eccentricity with the axis of rotation of said primary transmission member, thus into and out of active position; a coupling ring carried by said coupling member; the section of the case in which the driven shaft is journaled provided with spaced concentric surfaces, and said driven shaft within said case provided with similar spaced concentric surfaces; clutch rings located between said concentric surfaces; means, cooperating with said concentric surfaces, holding said clutch rings against rotation in one direction independently of said surfaces; said coupling ring and said clutch rings operatively connected, said connection adapted, thru the medium of the members of one set of said clutch rings, acting alternately, to cause said coupling ring, when in its eccentric position, to rotate in one direction, and thereby to transmit driving motion to the driven shaft thru the medium of the members of the other set of said clutch rings, acting alternately; a manually operated control including a spring controlled operating plate reciprocable axially relatively to said primary transmission member, said actuating plate having perpendicular arms, and cooperating means provided on said arms and said coupling member, whereby the reciprocation of said actuating plate causes said coupling member and therewith said coupling ring, to be moved into and out of eccentric, active position.

7. In a variable speed transmission comprising a case and normally disconnected driving and driven shafts journaled in said case, the means for transmitting motion from the driving to the driven shaft comprising a primary transmission member fast on the driving shaft; a coupling member carried by said transmission member and movable into and out of eccentricity with the axis of rotation thereof, thus into and out of active position; a coupling ring carried by said coupling member; a set of independently rotatable clutch rings associated with the case section in which said driven shaft is journaled, and another set of independently rotatable clutch rings associated with the driven shaft; operative connections between certain of said clutch rings and said coupling ring adapted to cause said coupling ring to rotate, when in eccentric position, and by such rotation, thru the medium of the other clutch rings, to transmit driving motion to said driven shaft; and a manually operated control for the movement of said coupling member and therewith said coupling ring into and out of eccentric, active position.

8. In a variable speed transmission comprising a case and normally disconnected driving and driven shafts journaled in said case, and means for transmitting motion from the driving to the driven shaft comprising a primary transmission member fast on the driving shaft; two members carried by said primary transmission member and oppositely movable into and out of eccentricity with the axis of rotation thereof, one of said members constituting a coupling member, the other a balance plate; a coupling ring carried by said coupling member; a set of independently rotatable clutch rings associated with the case section in which said driven shaft is journaled, and another set of independently rotatable clutch rings associated with the driven shaft; operative connections between certain of said clutch rings and said coupling ring adapted to cause said coupling ring to rotate, when in eccentric position, and by such rotation, thru the medium of the other clutch rings, to transmit driving motion to said driven shaft; and a manually operated control for the movement of said coupling member and therewith said coupling ring into and out of eccentric, active position.

9. In a gearless speed transmission having a driving shaft and a driven shaft, a power transmitting connection between said shafts, comprising a primary transmission member fast on the driving shaft, a coupling member carried by said primary transmission member, and movable into and out of eccentricity with the axis of rotation of said primary transmission member, and thus into and out of active position, a coupling ring carried by said coupling member, clutch means operatively connected with said coupling ring, and adapted to cause said coupling ring to rotate when in eccentric position, at a speed relative to the eccentricity of said coupling ring, other clutch means operatively connected with said coupling ring adapted to cause said coupling ring, when rotated, to drive said driven shaft, and manually operable means adapted to cause the movement of said coupling member and therewith said coupling ring into eccentric, active position, or concentric, inactive position.

10. In a gearless speed transmission having a driving shaft and a driven shaft, a power transmitting connection between said shafts, comprising a primary transmission member fast on the driving shaft, a coupling member carried by said primary transmission member, and movable into and out of eccentricity with the axis of rotation of said primary transmission member, and thus into and out of active position, a coupling ring carried by said coupling member, clutch means operatively connecting said driving and driven shafts thru the medium of said coupling ring; said clutch means comprising two sets of clutch rings, those of one set alternately engaging and releasing said coupling ring, and those of the other set, in cooperation with said coupling ring, transmitting the driving motion to said driven shaft, the movements of said clutch rings and said coupling ring complementing each other, whereby to cause said driven shaft to receive substantially even motion; and manually operable means adapted to cause the movement of said coupling member and therewith said coupling ring into eccentric, active position, or concentric, inactive position.

11. A gearless variable speed transmission comprising a divided case, a driving shaft journaled in one section of said case and a driven shaft journaled in the other section of said case; a primary transmission member fast on said driving shaft; a coupling member carried by said primary transmission member and movable into and out of eccentricity with the axis of rotation of said primary transmission member, thus into and out of active position; a coupling ring carried by said coupling member; the section of the case in which the driven shaft is journaled provided with two spaced, opposed concentric surfaces, and said driven shaft within said case provided with two similar spaced, opposed concentric surfaces; a pair of clutch rings located between each of the two opposed concentric surfaces; means, cooperating with said concentric surfaces, holding said clutch rings against rotation in one direction independently of said surfaces; said coupling ring and said clutch rings operatively connected, said operative connections comprising crank pin elements carried by said coupling ring, located equi-distant from the center of said coupling ring, and radial guideways in one pair of clutch rings in which said crank pin elements slidably bear, and crank pin elements carried by the other pair of clutch rings, located equi-distant from the center of rotation of the latter mentioned clutch rings, and radial guideways in said coupling ring in which said latter mentioned crank pin elements slidably bear; said coupling ring and said clutch rings operatively connected, said operative connections comprising crank pin elements carried by said coupling ring, located equi-distant from the center of said coupling ring, and radial guideways in one set of clutch rings in which guideways said crank pin elements slidably bear, and crank pin elements carried by the other set of clutch rings, located equi-distant from the center of rotation of the latter mentioned clutch rings, and radial guideways in said coupling ring in which the said latter mentioned crank pin elements slidably bear; one set of said clutch rings alternately engaging and releasing said coupling ring, and the other set of said clutch rings engaged by said coupling ring and transmitting motion to said driven shaft; the movements of said clutch rings and said coupling ring cooperating with and complementing each other, whereby to cause said driven shaft to receive substantially even motion; the rate of said motion imparted to said driven shaft being determined by the extent of eccentricity of said coupling ring; a manually operated control including a spring controlled actuating plate reciprocable axially relatively to said primary transmission member, and connections between said actuating plate and said coupling member adapted to cause the movement of said coupling member, and with it said coupling ring, automatically into and out of eccentric position.

12. A gearless variable speed transmission comprising a divided case, a driving shaft journaled in one section of said case and a driven shaft journaled in the other section of said case; a primary transmission member fast on said driving shaft; a coupling member carried by said primary transmission member and movable into and out of eccentricity with the axis of rotation of said primary transmission member, thus into and out of active position; a coupling ring carried by said coupling member; the section of the case in which the driven shaft is journaled provided with spaced concentric surfaces, and said driven shaft within said case provided with similar spaced, concentric surfaces; clutch rings located between said concentric surfaces; means, cooperating with said concentric surfaces, holding said clutch rings against rotation in one direction independently of said surfaces; said coupling ring and said clutch rings operatively connected, said operative connections comprising crank pin elements carried by said coupling ring, located equi-distant from the center of said coupling ring, and radial guideways in one set of clutch rings in which said crank pin elements slidably bear, and crank pin elements carried by the other set of clutch rings, located equi-distant from the center of rotation of the latter mentioned clutch rings, and radial guideways in said coupling ring in which said latter mentioned crank pin elements slidably bear; said operative connections adapted, thru the medium of one set of clutch rings, acting alternately, to cause said coupling ring, when in eccentric position, to be rotated in one direction, and, thru the medium of the other set of clutch rings, acting alternately, to cause said driven shaft to be rotated by said coupling ring when the latter is rotated; the speed of rotation of said coupling ring, and thereby the speed of rotation of said driven shaft, being determined by the extent of eccentricity of said coupling ring from the center of rotation of said primary transmission member; a manually operated control including a spring controlled operating plate reciprocable axially relatively to said primary transmission member, said actuating plate having perpendicular arms, and cooperating means provided on said arms and said coupling member, whereby the reciprocation of said actuating plate causes said coupling member and therewith said coupling ring, to be moved into and out of eccentric, active position.

FERDINAND W. SEECK.